United States Patent [19]

Becker et al.

[11] Patent Number: 5,577,369
[45] Date of Patent: Nov. 26, 1996

[54] METHOD OF MAKING AND FILLING A MULTI-CHAMBER CONTAINER

[75] Inventors: Michael Becker, Palatine; Jim Chase, Grayslake; Christopher Papa, Naperville; Jeff Jones, Antioch, all of Ill.

[73] Assignee: Clintec Nutrition Company, Deerfield, Ill.

[21] Appl. No.: 430,476

[22] Filed: Apr. 28, 1995

Related U.S. Application Data

[62] Division of Ser. No. 33,233, Mar. 16, 1993.

[51] Int. Cl.$^6$ .................................. B65B 29/10
[52] U.S. Cl. .................. 53/474; 53/170; 53/449; 53/477
[58] Field of Search ............... 53/474, 477, 445, 53/449, 451, 455, 562, 170; 206/219

[56] References Cited

U.S. PATENT DOCUMENTS

| | | | |
|---|---|---|---|
| 3,074,544 | 1/1963 | Bollmeier et al. | 206/219 |
| 3,940,905 | 3/1976 | Perry, 3rd | 53/474 X |
| 4,608,043 | 8/1986 | Larkin | 206/219 X |
| 4,637,199 | 1/1987 | Steck et al. | 53/451 |
| 4,686,125 | 8/1987 | Johnston et al. | 428/35 |
| 4,769,261 | 9/1988 | Hazelton et al. | 53/455 |
| 4,770,295 | 9/1988 | Carveth et al. | 206/219 |
| 4,961,495 | 10/1990 | Yoshida et al. | 206/219 |
| 5,133,172 | 7/1992 | Soubrier | 53/455 |
| 5,176,634 | 1/1993 | Smith et al. | 206/219 X |
| 5,209,347 | 5/1993 | Fabisiewicz et al. | 206/219 |

FOREIGN PATENT DOCUMENTS

WO92/02271  2/1992  WIPO.

*Primary Examiner*—James F. Coan
*Attorney, Agent, or Firm*—Hill, Steadman & Simpson

[57] ABSTRACT

A container capable of containing components of a mixture in chambers separated by a peelable seal constructed from a multi-layer film. The multi-layer film has at least one layer of a RF-responsive material and an interior layer of non-RF responsive material. When the layers are subjected to RF energy, the RF-responsive layer heats the interior layers resulting in a bond in the form of a peelable seal between the interior layers. The peelable seal is capable of withstanding external pressures to the container, such as from dropping the container. The seal may be selectively opened to allow mixture of components contained therein.

8 Claims, 1 Drawing Sheet

METHOD OF MAKING AND FILLING A MULTI-CHAMBER CONTAINER

This is a division of application Ser. No. 08/033,233, filed Mar. 16, 1993.

BACKGROUND OF THE INVENTION

The present invention generally relates to flexible containers for housing liquid products. More particularly, the present invention relates to multi-chamber containers having a selectively openable seal line between two chambers.

Flexible containers, constructed from plastic films, are commonly used in the medical field for containing, inter alia, parenteral, enteral, and dialysis solutions. A great variety of such solutions can be housed and stored in such containers.

There are, however, a number of products that due to stability, compatibility, or other concerns must be stored in component parts in separate containers and admixed before use. For example, amino acid and dextrose solutions require separate storage containers or compartments. These components, therefore, are stored separately and then mixed prior to use.

One of the disadvantages of storing components in separate containers and then mixing them together is that the mixing process can compromise sterility of the system. Additionally, this step creates a labor intense process.

To deal with the disadvantages of separate containers, it is known to provide multiple chamber containers having an interior including two or more chambers. One way to create such a container is with a heat seal dividing the interior into two chambers. Such containers are disclosed, for example, in U.S. Pat. Nos. 4,396,388; 4,770,295; 3,950,158; 4,000,996; and 4,226,330.

It is known to use frangible valves between the heat seal to allow for selective communication and mixing of the two components stored in the separate chambers. See, for example, U.S. Pat. No. 4,396,488.

However, such a structure—frangible valves—may not be desirable for a number of reasons, including, inter alia, cost. An alternative to frangible valves is disclosed in U.S. Pat. Nos. 3,950,158, 4,000,996 and 4,226,330, where multiple chamber containers are disclosed with a line of weakness, such as a score line, which breaks upon the application of pressure.

In U. S. Pat. No. 4,770,295, a selectively openable seal line is positioned between two sheets of flexible thermoplastic material. The seal line is resistant to unintentional opening forces, but opens upon application of a specific force. The seal line may be employed in various containers, including a two chamber container for the separate storage and selective mixing of two medical substances. The container includes two sheets forming the exterior of the container and an inner diaphragm sheet between the outer sheets. One selectively openable seal is disposed between one of the outer sheets and the diaphragm sheet. A permanent line of securement is preferably included between the exterior sheet and the diaphragm sheet extending substantially parallel to and co-extensive with the openable seal line.

In addition, tear tabs or tear strips for plastic packaging are also known, such as shown in U.S. Pat. No. 2,991,000. Such tear tabs provide access to the contents of the container. However, a disadvantage with these containers is that they also involve the use of relatively complicated seal structures. U.S. Pat. No. 3,983,994 discloses a seal broken by pulling upon tabs located outside of the container.

Another issue that must be considered in constructing containers for the medical industry is that the solutions, and therefore the containers, often require sterilization after manufacture of the container and solution. Typically, the products are sterilized by steam sterilization, or autoclaving. Autoclave sterilization can alter the thermal properties of the film used to form the container and seal between chambers of the container.

Of course, it is desirable to provide a multichamber container with a seal between the chambers that is capable of withstanding external stresses. Such stresses include pressure that may be applied to one or more of the chambers from, for example, squeezing thereof, or accidental dropping of the bag. Therefore, the seal must be sufficiently strong.

However, a difficulty in creating the seal is that the strength of the seal typically increases during sterilization. As a result, a seal may be too strong after the sterilization process making it difficult to separate the seal to combine the components within the chambers.

A need, therefore, exists for a flexible container having chambers separated by a frangible or separable seal that overcomes the disadvantages of the prior art.

SUMMARY OF THE INVENTION

The present invention provides a flexible container defining a plurality of internal compartments separated by a seal. At least the seal region is constructed from a film that comprises at least two layers, one of which is RF-responsive and the other layer, the inner layer, being non-RF responsive. The RF-responsive layer, in response to RF energy, heats the non-RF responsive interior layer to form a peelable seal that is defined by a bonding between the non-RF responsive layers that define an interior of the container.

Preferably, the non-RF responsive layer is an alloy of at least two materials that have differing melting points. To create the seal, the layer is heated to a temperature wherein only one of the materials melts.

In an embodiment, the seal layer is an alloy of styrene-ethylene-butyl-styrene (SEBS) and ethylene propylene copolymer. Accordingly, when the seal is being created, the inner layer is heated by the RF-responsive layer to a temperature wherein the SEBS melts and flows into a corresponding inner layer. However, the temperature is not great enough to cause the ethylene propylene copolymer to melt. A seal is created between the two inner layers due to the melting of the SEBS. This creates a strong seal between the two inner layers that can be "peeled" when desired using a force normal thereto.

The present invention also provides a method for making a multi-chamber container comprising the steps of providing a web of plastic film having a first non-RF responsive layer and a second RF-responsive layer; sealing opposing edges of the web of film to create an interior defined, at least in part, by the inner layers; and creating an inner seal, defining at least two chambers, by applying RF energy and causing a portion of the inner layers to seal to themselves.

An advantage of the present invention is to provide a container having a peelable seal capable of withstanding external stresses due to pressure applied to the container or to individual chambers of the container.

A further advantage of the present invention is to provide a container having a peelable seal that strengthens during sterilization yet is capable of being easily opened by healthcare personnel.

Moreover, an advantage of the present invention is to provide a container having a peelable seal which is uniform in strength across the length of the seal allowing for improved performance since the concentration of stress is inside the seal area.

A still further advantage of the present invention is to provide a container having a peelable seal that readily separates when desired.

Another advantage of the present invention is to provide a container having a peelable seal that is RF sealed rather than heat sealed.

A further advantage of the present invention is to provide a container having a peelable seal which is formed with a seal bar that results in a strong, consistent seal.

A still further advantage of the present invention is to provide a container having a peelable seal separating chambers of the container thereby requiring no special polymer alloys, intermediate zones or external devices in order to maintain a separation of solutions.

Moreover, another advantage of the present invention is to provide a container having a peelable seal which stretches when selectively opened rather than fractures.

Yet another advantage of the present invention is to provide a container having a peelable seal which is simple to manufacture using a minimal amount of material.

Another advantage of the present invention is to provide a container in which the solutions and/or products contained therein do not react with the film of the container.

Additional features and advantages are described in, and will be apparent from, the detailed description of the presently preferred embodiments and from the drawings.

DETAILED DESCRIPTION OF THE PRESENTLY PREFERRED EMBODIMENTS

The present invention provides a multi-chambered container that can be used to house two products that are to be stored separately prior to use. Due to the unique seal structure, the two products can be easily mixed prior to use.

Figure 1:
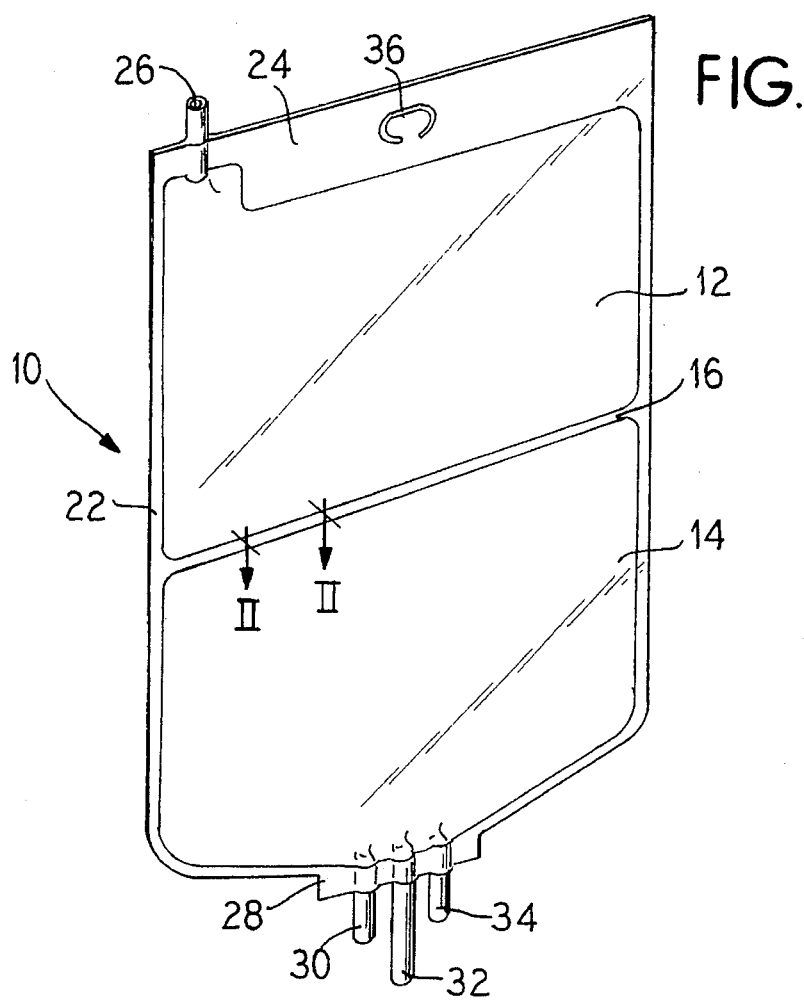
FIG. 1 of the present invention is a perspective view of a flexible container separated into two chambers by a seal line.

Referring to FIG. 1, a multi-chambered container 10 is generally shown. The container 10 includes two chambers 12 and 14 for the separate storage of substances and/or solutions. A peelable seal 16 is provided between the chambers 12 and 14. Although in the embodiment illustrated, the container 10 includes two chambers 12 and 14, it should be appreciated that additional peelable seals may be included to divide the container 10 into additional chambers.

The container 10 is formed from a flexible sheet of plastic. The container may be formed from two sheets of film that are heat sealed along their edges. However, the container can be formed from a web of film folded over and sealed along three sides. Pursuant to the present invention, the container is formed from a multi-layer film discussed below.

Figure 2:
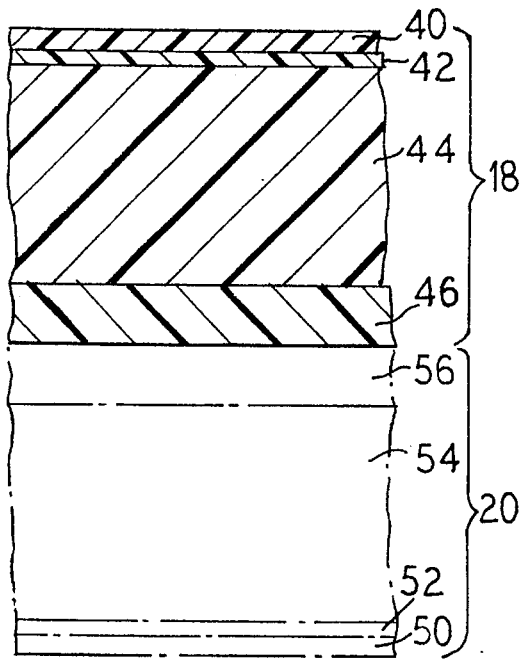
FIG. 2 is a cross-sectional view of an embodiment of the film used to construct the container of the present invention taken generally along plane II—II of FIG. 1.

In the illustrated embodiment as shown in FIG. 2, two sheets of film are used. A first sheet 18 and a second sheet 20 are sealed about the periphery 22 of the container 10 by, for example, heat sealing. The peelable seal 16, described more fully below, is provided between the sheets 18 and 20 to form the chambers 12 and 14.

In the preferred embodiment illustrated in FIG. 1, at a top end 24 of the container 10 is a tubular port 26. The port 26 provides communication with the chamber 12 and can include a suitable membrane covering which can be pierced by, for example, a cannula or a spike of an administration set so that additional substances and/or solutions can be added to the chamber 12. The tubular port 26 allows the first chamber 12 to be filled.

At a bottom end 28 of the container 10, in the illustrated embodiment, are three tubular ports 30, 32 and 34. One of the tubular ports 30, 32, or 34 allows the second chamber 14 to be filled with a liquid. The tubular ports 30, 32 and 34 also allow the medical substances contained within the container 10 to be discharged to one or more patients. Similarly, the tubular ports 30, 32, and 34 allow medicaments to be injected into the container.

The tubular ports 30, 32 and 34 are mounted in the container 10 to communicate with the container 10 via the chamber 14. The ports 30, 32 and 34 can include a membrane that is pierced by, for example, a cannula or a spike of an administration set for delivery of the contents of the container 10 through the administration set to the patient. Of course, more or less than three ports can be used.

Preferably, at the top end 24 of the container 10 is an area which includes a hanger hole 36 for supporting the container 10 by, for example, a hook (not shown).

In FIG. 2, the sheets 18 and 20 which form the container are illustrated in cross-sectional view. Specifically, the seal 16 is illustrated at the junction of the sheet 18 with the sheet 20. The seal 16 is formed such that no communication between the chambers 12 and 14 is provided until the seal 16 is broken. Rupturing of the peelable seal 16 serves to provide communication between the chambers 12 and 14 allowing a mixing of the substances stored therein.

The sheets 18 and 20 are flexible and are preferably made of the same materials. In the illustrated embodiment, the first sheet 18 includes a first layer 40 forming an outer surface or abuse layer of the container 10. The first layer 40 may be, for example, a thermoplastic material such as PCCE. A typical thickness of the first layer 40, in a preferred embodiment, is approximately 0.55 mil but may vary, for example, between 0.40 mil and 0.70 mil.

A tie layer 42 can be provided to provide a binding layer between the outside layer 40 and a second layer 44 of the sheet 18 which is RF-responsive. Although in a preferred embodiment, the tie layer 42 has a thickness of approximately 0.4 mils, the tie layer 42 may, however, have a varied thickness, for example, between 0.25 mils and 0.55 mils. The tie layer 42 can be a thermoplastic material such as ethyl vinyl acetate (EVA) modified with malic anhydride.

The second layer 44 is an RF-responsive layer that, as discussed below, cooperates with a sealing or inner layer 46 to create the seal. The second layer 44 can be any RF-responsive material. In a preferred embodiment, the RF-responsive material is an ethyl vinyl acetate (EVA). It has been found that a layer thickness of approximately 6.2 mils functions satisfactorily. However, the second layer 44 can have a varied thickness of between, for example, at least 5.75 mils and 6.75 mils.

The sealing layer 46 is made of a non-RF responsive material. Preferably, the non-RF responsive layer includes at least two materials having different melting points. In an embodiment, the non-RF-responsive layer is an alloy of styrene-ethylene-butyl-styrene (SEBS) for example, Kraton®, and ethylene polypropylene copolymer. It has been found that if the sealing layer has a thickness of approximately 1.6 mils it functions satisfactorily. However, the thickness may vary, for example, between 1.40 mils and 1.80 mils.

The sealing layer 46 is adjacent the solution side of the container such that when the seal 16 is ruptured, communication is provided between the chambers 12 and 14. As noted above, the four-layer film illustrated in FIG. 2 has at least one RF-responsive layer 44 and one non-RF responsive layer 46. A RF field heats a seal bar 62 (described hereinafter with reference to FIG. 3) which heats the RF-responsive layer 44 which, in turn, heats the non-RF responsive layer 46 to soften the layer 46, but not liquify same. A resulting cohesive bond develops from contact between the non-RF responsive layer 46 of the sheet 18 and a corresponding non-RF responsive layer 56 of the sheet 20, but fusion between the layers, which can cause permanent bonding, does not occur.

As previously indicated, the container 10 can be formed by folding a single web, such as the sheet 18, or alternatively, the sheet 20 can be further provided in addition to the sheet 18. In the preferred embodiment, the sheet 20 is a four-layer film in which layers 50, 52, 54 and 56 of the sheet 20 substantially correspond to the layers 40, 42, 44 and 46 of the sheet 18, respectively. As a result, the sealing layer 56 of the sheet 20 forms a cohesive bond with the sealing layer 46 of the sheet 18. The cohesive bond formed is the peelable seal 16.

Figure 3:
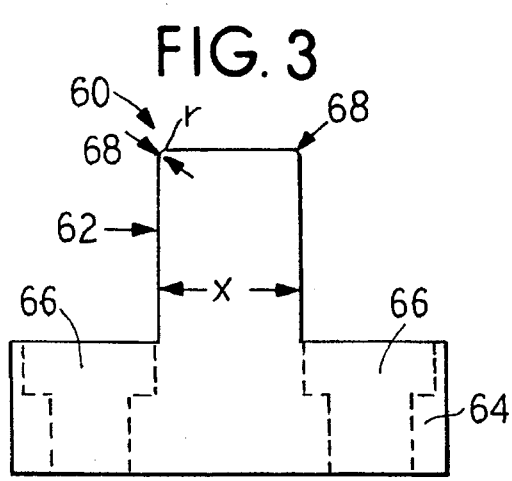
FIG. 3 is an end view of an embodiment of a die used to create the seal line of the container of the present invention.

The peelable seal 16 is formed by radio frequency welding of the two sheets 18 and 20. As illustrated in FIG. 3, a die 60 is generally shown. The die 60 includes the seal bar 62 which is formed to project substantially perpendicularly to a base 64 on which the seal bar 62 is integrally mounted. The base 64 can be further secured to manufacturing components (not shown) by fasteners (not shown) inserted through holes 66 in the base 64. The seal bar 62 of the die 60 is used to form the peelable seal 16 wherein the seal bar 62 can be energized using RF energy.

The seal bar 62, as illustrated, has a substantially equal width, designated as "x" in FIG. 3, of, in the preferred embodiment, approximately ⅜ inches. The seal bar 62 further includes radiused corners 68 so as to create a strong, consistent seal 16 across the container 10. In the preferred embodiment illustrated, the radial dimension is 1/16", generally designated as "r". The peelable seal 16 formed using the seal bar 62 of the present invention results in a bond which is less likely to break due to external forces exerted thereon.

By way of example, and not limitation, an example of how the peel seal is created will be given. In a preferred embodiment, the inner layer includes SEBS and ethylene polypropylene. SEBS has a melting point of approximately 127° C. and ethylene polypropylene approximately 140° C. The die, illustrated in FIG. 3, is initially heated to a temperature of 50° C. and urged against the container in a position to create the desired seal. The die is then energized with sufficient RF energy to reach a temperature of between 128° C. and 131° C. This creates the peel seal.

It should be noted that in creating the side seals, a temperature of greater than 140° C. is used. This creates complete fusion of the side seal area.

It should be appreciated that fewer layers for each of the sheets 18 and 20 than the four-layer film described with reference to FIG. 2 can be used to create the peelable seal 16 of the present invention. At a minimum, two layers are required, one layer being RF-responsive and the other layer being non-RF responsive. Reliability and strengthening of the peelable seal 16 may be further enhanced by using corona treatment or an extrusion process.

The peelable seal 16 is preferably formed to withstand external pressure to one or both chambers 12 and 14 of the container. Furthermore, the peelable seal 16 is capable of withstanding pressure exerted by dropping the container 10 either on its side or if it is dropped flat. Preferably, the peelable seal 16 can withstand rupture from a drop of up to six feet.

Post-sterilization of the chambers 12 and 14 of the container 10 substantially increases the pressure which the peelable seal 16 is capable of withstanding before rupture. More specifically, sterilization can increase seal strength between 40 and 80 percent.

It should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

We claim:

1. A method for making a multi-chamber container, the method comprising the steps of:

providing a web of plastic film having a first continuously formed non-RF-responsive layer and a second continuously formed non-RF-responsive layer wherein the first layer and the second layer are continuously bonded to each other;

sealing opposing edges of the web of film to create an interior defined, at least in part, by an inner layer of the film; and creating an inner seal defining at least two chambers by applying RF energy and causing a portion of opposing inner layers of the film to seal themselves.

2. The method of claim 1 further comprising the step of:

applying only sufficient RF energy to cause only one of two alloys that comprise the first non-RF-responsive layer to melt.

3. The method of claim 1 further comprising the step of:

filling at least one chamber with a medical solution.

4. The method of claim 1 wherein the first non-RF-responsive layer includes SEBS and ethylene propylene copolymer.

5. The method of claim 1 wherein the film includes at least three layers.

6. The method of claim 1 wherein the RF-responsive layer includes ethylene vinyl acetate.

7. The method of claim 1 further comprising the step of:

providing the container with at least two ports.

8. The method of claim 1 further comprising the step of:

filling a first chamber and a second chamber in the interior with different medical solutions.

\* \* \* \* \*